United States Patent
Li et al.

(10) Patent No.: US 10,798,357 B2
(45) Date of Patent: Oct. 6, 2020

(54) METHOD AND DEVICE FOR CORRECTING COLOR TEMPERATURE OF FLASH LAMP

(71) Applicant: BEIJING XIAOMI MOBILE SOFTWARE CO., LTD., Beijing (CN)

(72) Inventors: Guosheng Li, Beijing (CN); Yihan Wu, Beijing (CN)

(73) Assignee: Beijing Xiaomi Mobile Software co., Ltd., Beijing (CN)

( * ) Notice: Subject to any disclaimer, the term of this patent is extended or adjusted under 35 U.S.C. 154(b) by 217 days.

(21) Appl. No.: 16/119,729

(22) Filed: Aug. 31, 2018

(65) Prior Publication Data

US 2019/0132567 A1 May 2, 2019

(30) Foreign Application Priority Data

Oct. 27, 2017 (CN) .......................... 2017 1 1023033

(51) Int. Cl.
| | | |
|---|---|---|
| *H04N 9/73* | (2006.01) | |
| *H04N 5/235* | (2006.01) | |
| *G03B 33/00* | (2006.01) | |
| *G03B 7/17* | (2014.01) | |
| *G03B 15/05* | (2006.01) | |
| *H04N 5/225* | (2006.01) | |

(52) U.S. Cl.
CPC .............. *H04N 9/735* (2013.01); *G03B 7/17* (2015.01); *G03B 15/05* (2013.01); *G03B 33/00* (2013.01); *H04N 5/2256* (2013.01); *H04N 5/2354* (2013.01)

(58) Field of Classification Search
CPC .... H04N 9/735; H04N 5/2256; H04N 5/2354; G03B 15/05; G03B 7/17; G03B 33/00; G03B 15/03; G06T 5/007
See application file for complete search history.

(56) References Cited

U.S. PATENT DOCUMENTS

| | | |
|---|---|---|
| 2012/0026356 A1 | 2/2012 | Nakagawara |
| 2016/0088278 A1 | 3/2016 | Velarde |
| 2016/0191881 A1 | 6/2016 | Sako |

FOREIGN PATENT DOCUMENTS

JP     2010102208 A     5/2010

OTHER PUBLICATIONS

European Office Action issued in EP18202396.0, dated Mar. 28, 2019, 7 pages.

*Primary Examiner* — Twyler L Haskins
*Assistant Examiner* — Angel L Garces-Rivera
(74) *Attorney, Agent, or Firm* — Arch & Lake LLP

(57) ABSTRACT

The present disclosure relates to a method and a device for correcting a color temperature of a flash lamp in the field of the computer technology. The method includes: obtaining a first color temperature value of a gray point region in a first image, in which the first image is obtained by capturing a scene when the flash lamp is closed; searching for an image region corresponding to the gray point region in a second image, in which the second image is obtained by capturing the scene when the flash lamp is open; and correcting the color temperature for the light compensation of the flash lamp according to a difference obtained by subtracting the first color temperature value from the second color temperature value.

20 Claims, 2 Drawing Sheets

METHOD AND DEVICE FOR CORRECTING COLOR TEMPERATURE OF FLASH LAMP

CROSS-REFERENCE TO RELATED APPLICATIONS

This application claims priority to Chinese Patent Application No. 201711023033.8, filed on Oct. 27, 2017, the entire content of which is incorporated herein by reference for all purposes.

TECHNICAL FIELD

The present disclosure generally relates to the field of computer technology, and more particularly, to a method and a device for correcting color temperature of a flash lamp.

BACKGROUND

A flash lamp is configured to flash with respect to environment light during photographing. The flash lamp can improve the quality of photographed image when the environment light is insufficient. The color temperature for the light compensation of the flash lamp is generally adjustable. However, the range for managing and controlling the color temperature of a single lamp can be ±250K, and thus the largest difference for correction is 500K. The correction error is large.

SUMMARY

The present disclosure provides a method and a device and a non-transitory computer-readable storage medium for correcting color temperature of a flash lamp.

According to examples of the present disclosure, there is provided a method for correcting a color temperature of a flash lamp. The method may include: obtaining a first color temperature value of a gray point region in a first image, in which the first image is obtained by capturing a scene when the flash lamp is closed, and a difference between values of two color channels of a gray point in the gray point region is less than a preset value; searching for an image region corresponding to the gray point region in a second image, in which the second image is obtained by capturing the scene when the flash lamp is open, and pixel points exist in the image region and the pixel points correspond to gray points in the gray point region; obtaining a second color temperature value of the image region; and correcting the color temperature for light compensation of the flash lamp according to a difference obtained by subtracting the first color temperature value from the second color temperature value.

According to examples of the present disclosure, there is provided a device for correcting a color temperature of a flash lamp. The device may include: a processor, a memory configured to store instructions executable to the processor, and a camera having the flash lamp. The processor may be configured to: obtain a first color temperature value of a gray point region in a first image, in which the first image is obtained by capturing a scene when the flash lamp is closed, and a difference between values of two color channels of a gray point in the gray point region is less than a preset value; search for an image region corresponding to the gray point region in a second image, in which the second image is obtained by capturing the scene when the flash lamp is open, and pixel points exist in the image region and the pixel points correspond to gray points in the gray point region; obtain a second color temperature value of the image region; and correct the color temperature for light compensation of the flash lamp according to a difference obtained by subtracting the first color temperature value from the second color temperature value.

According to examples of the present disclosure, there is provided a non-transitory computer-readable storage medium, configured to store at least one instruction thereon. The at least one instruction may be executed by a processor to implement: obtaining a first color temperature value of a gray point region in a first image, in which the first image is obtained by capturing a scene when a flash lamp is closed, and a difference between values of two color channels of a gray point in the gray point region is less than a preset value; searching for an image region corresponding to the gray point region in a second image, in which the second image is obtained by capturing the scene when the flash lamp is open, and pixel points exist in the image region and the pixel points correspond to gray points in the gray point region; obtaining a second color temperature value of the image region; and correcting a color temperature for the light compensation of the flash lamp according to a difference obtained by subtracting the first color temperature value from the second color temperature value.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate examples consistent with the invention and, together with the description, serve to explain the principles of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the invention. Instead, they are merely examples of apparatuses and methods consistent with aspects related to the invention as recited in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1:
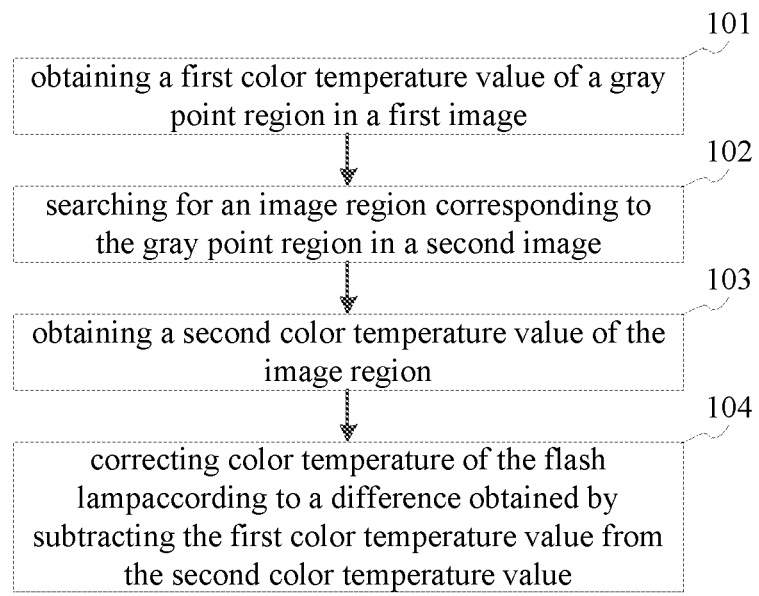
FIG. 1 is a flow chart illustrating a method for correcting color temperature of a flash lamp according to an example.

FIG. 1 is a flow chart illustrating a method for correcting color temperature of a flash lamp according to an example. The method for correcting color temperature of a flash lamp includes follows.

At block 101, a first color temperature value of a gray point region in a first image is obtained.

The first image is obtained by capturing a scene when the flash lamp is closed. The first image may be captured when a user presses the shutter. Alternatively, the first image may be automatically captured by a terminal when the terminal is finding a view, and the user does not press the shutter. In this case, the first image is merely used to calculate the first color temperature value of the gray point region, and the terminal does not store the first image.

In this case, the color temperature value of the gray point region in the first image is a color temperature value of environment light.

A difference between values of two color channels of a gray point in the gray point region is less than a preset value. For example, there are three color channels, i.e., R (red), G (Green) and B (Blue), a value of R is a, a value of G is b, and a value of B is c. Then, the difference between values of two color channels of a gray point in the gray point region being less than the preset value means that a difference between a and b is less than the preset value, a difference between b and c is less than the preset value, and a difference between a and c is less than the preset value.

In one possible implementation, the difference between values of two color channels may be zero. At this time, values of respective color channels of a gray point are the same.

The gray point region may be a single complete region, or the gray point region may be composed by a plurality of discrete sub regions, which is not limited in examples of the present disclosure. Alternatively, the gray point region is a single complete region, while some pixel points in the gray point region are gray points and some pixel points in the gray point region are not gray points.

When the first color temperature of the gray point region is calculated, color temperature values of the gray points in the gray point region are calculated first. The color temperature values of these gray points in the gray point region may be different. Therefore, a mean value of the color temperature values of these gray points in the gray point region may be calculated, and the mean value may be determined as the first color temperature value.

The flash lamp may include one flash lamp, or the flash lamp may include at least two flash lamps with different color temperatures, which is not limited in examples of present disclosure.

At block 102, an image region corresponding to the gray point region is searched for in a second image.

The second image is obtained by capturing the scene when the flash lamp is open. The scene captured in the second image is same as that captured in the first image, such that there is an image region, in the second image, corresponding to the gray point region in the first image. There are pixel points, in the image region, corresponding to the gray points in the gray point region.

The environment light is insufficient when the first image is captured. Therefore, compared to the first image, light compensation effect of the flash lamp is obvious when the second image is captured, improving accuracy of color temperature correction. In an application scenario, the first image is obtained by capturing a wall in the night when the flash lamp is closed, and the second image is obtained by capturing the wall at a same position in the night when the flash lamp is open.

At block 103, a second color temperature value of the image region is obtained.

In some examples of the present disclosure, in order to distinguish the color temperature value of the gray point region and the color temperature value of the image region, the color temperature value of the gray point region is called as the first color temperature value, and the color temperature value of the image region is called as the second color temperature value.

When the second color temperature value of the image region is calculated, color temperature values of pixel points in the image region corresponding to the gray points are calculated first. The color temperature values of these pixel points in the image region may be different. Therefore, a mean value of the color temperature values of these pixel points in the image region may be calculated, and the mean value may be determined as the second color temperature value.

At block 104, a color temperature of the flash lamp is corrected according to a difference obtained by subtracting the first color temperature value from the second color temperature value.

The range for managing and controlling color temperature of a single lamp is reduced by reducing a bin region of a color temperature block, and thus the correction error of the flash lamp is reduced. The bin region is a smaller color temperature block obtained by subdividing the color temperature block.

Examples of the present disclosure aims to correct the light compensation color temperature of the flash lamp to the first color temperature value, such that the light compensation color temperature of the flash lamp is consistent with the color temperature of the environment light, thus improving image quality.

In conclusion, with the method for correcting color temperature of a flash lamp provided by the present disclosure, since the first image is obtained by capturing the scene when the flash lamp is closed, and the second image is obtained by capturing the scene when the flash lamp is open, by calculating the difference of color temperature values of the same region in the first image and the second image, and by correcting the flash lamp using the difference of color temperature values, a correction error of the flash lamp may be reduced, such that the light compensation color temperature of the flash lamp is consistent with the color temperature of the environment light, improving image quality. In addition, a problem of increasing cost when the correction error is reduced by reducing the bin region is avoided, thus reducing the cost for correcting the color temperature.

Figure 2:
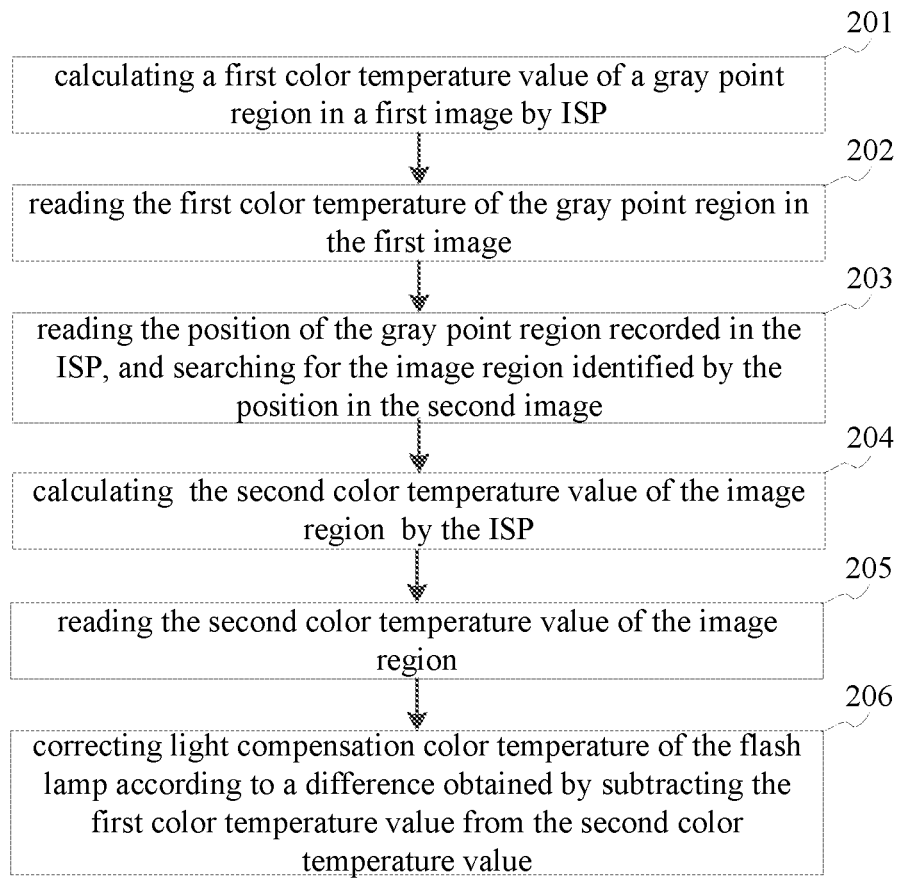
FIG. 2 is a flow chart illustrating a method for correcting color temperature of a flash lamp according to another example.

FIG. 2 is a flow chart illustrating a method for correcting color temperature of a flash lamp according to another example. The method for correcting color temperature of a flash lamp includes follows.

At block 201, a first color temperature value of a gray point region in a first image is obtained by image signal processing (ISP).

The first image is obtained by capturing a scene when the flash lamp is closed. The first image may be captured when a user presses the shutter. Alternatively, the first image may be automatically captured by a terminal when the terminal is finding a view, and the user does not press the shutter. In this case, the first image is merely used to calculate the first color temperature value of the gray point region, and the terminal does not store the first image.

In this case, the color temperature value of the gray point region in the first image is a color temperature value of environment light.

A difference between values of two color channels of a gray point in the gray point region is less than a preset value. For example, there are three color channels, i.e., R (red), G (Green) and B (Blue), a value of R is a, a value of G is b, and a value of B is c. Then, the difference between values of two color channels of a gray point in the gray point region being less than the preset value means that a difference between a and b being less than the preset value, a difference between b and c being less than the preset value, and a difference between a and c being less than the preset value.

In one possible implementation, the difference between values of two color channels may be zero. At this time, values of respective color channels of a gray point are the same.

The gray point region may be a single complete region, or the gray point region may be composed by a plurality of discrete sub regions, which is not limited in examples of the present disclosure. Alternatively, the gray point region is a single complete region, while some pixel points in the gray point region are gray points and some pixel points in the gray point region are not gray points.

By the ISP, the gray point region is recognized from the first image, position of each gray point in the gray point region is recorded, and the color temperature values of the gray points are calculated.

The color temperature values of these gray points in the gray point region may be different. Therefore, when the first color temperature value of the gray point region is calculated, a mean value of the color temperature values of these gray points in the gray point region may be calculated, and the mean value may be determined as the first color temperature value.

At block 202, the first color temperature value of the gray point region in the first image is read.

At block 203, the position of the gray point region recorded in the ISP is read, and the image region identified by the position is searched for in the second image.

The second image is obtained by capturing the scene when the flash lamp is open. The scene captured in the second image is same as that captured in the first image, such that there is an image region, in the second image, corresponding to the gray point region in the first image. There are pixel points, in the image region, corresponding to the gray points in the gray point region. That is, The ISP records positions of the gray points in the gray point region. A pixel point identified by each position is searched for in the second image, and these found pixel points compose the image region.

The environment light is insufficient when the first image is captured. Therefore, compared to the first image, light compensation effect of the flash lamp is obvious when the second image is captured, improving accuracy of color temperature correction. In an application scenario, the first image is obtained by capturing a wall in the night when the flash lamp is closed, and the second image is obtained by capturing the wall at a same position in the night when the flash lamp is open.

At block 204, the second color temperature value of the image region is calculated by the ISP.

In some examples of the present disclosure, in order to distinguish the color temperature value of the gray point region and the color temperature value of the image region, the color temperature value of the gray point region is called as the first color temperature value, and the color temperature value of the image region is called as the second color temperature value.

When the second color temperature value of the image region is calculated, the ISP finds out the image region and calculates color temperature values of pixel points in the image region corresponding to the gray points. The color temperature values of these pixel points in the image region may be different. Therefore, ISP may calculate a mean value of the color temperature values of these pixel points in the image region, and take the mean value as the second color temperature value.

At block 205, the second color temperature value of the image region is read.

At block 206, a light compensation color temperature of the flash lamp is corrected according to a difference obtained by subtracting the first color temperature value from the second color temperature value.

In some examples of the present disclosure, correcting the light compensation color temperature of the flash lamp according to the difference obtained by subtracting the first color temperature value from the second color temperature value includes follows. The difference is calculated by subtracting the first color temperature value from the second color temperature value. A curve is updated according to the difference. The curve is configured to represent a correspondence relationship between the first color temperature values and adjusting parameters, in which the adjusting parameter is configured to control the flash lamp to flash.

A horizontal axis of the curve may be the first color temperature value, and a vertical axis of the curve may be the adjusting parameter. When the first color temperature value of the gray point region in the first image is calculated, the adjusting parameter corresponding to the first color temperature value may be directly found out in the curve, such that the flash lamp may be controlled to flash according to the adjusting parameter. When the curve is correct, the light compensation color temperature can be consistent with the color temperature of the environment light just by one correction, greatly improving efficiency of correcting the color temperature.

In the initial, the curve is preset, which may be not suitable for the flash lamp. The curve may be updated during correcting the light compensation color temperature of the flash lamp, such that the flash lamp flashes according to the adjusting parameter in the updated curve when capturing at next time. Further, a difference calculated at next time is less than a difference calculated at this time, and the difference calculated at next time is a difference obtained by subtracting a first color temperature value of a gray point region in a first image captured at next time from a second color temperature value of an image region in a second image captured at next time. The curve is updated by this gradual approximation approach, and thus a correct curve is obtained finally when the correction is finished.

In some examples, the flash lamp may include one flash lamp, or the flash lamp may include at least two flash lamps with different color temperatures, which is not limited in examples of present disclosure. When the flash lamp includes two flash lamps with different color temperatures, the flash lamp includes one cold light lamp and one warm light lamp, and the flash lamp may be called as two-color-temperature flash lamp.

Each flash lamp has a different color temperature, and thus each flash lamp has a different adjusting parameter for adjusting the light compensation color temperature to the first color temperature value. Therefore, there is a need to set one curve representing a correspondence relationship between the first color temperature values and the adjusting parameters for each flash lamp. In this way, when it is intended to increase the light compensation color temperature of the flash lamp, it is possible to merely increase the light compensation color temperature of only one of the flash lamps. In this case, it only needs to update the curve of the only one flash lamp. When it is intended to increase the light compensation color temperature of the flash lamp, it is also possible to increase the light compensation color temperature of at least two of the flash lamps. In this case, it needs to update the curves of the at least two flash lamps.

For example, the flash lamp is double-color-temperature flash lamp. Assuming that it is intended to increase the light compensation color temperature of the flash lamp when the color temperature of the flash lamp is adjusted, the light compensation color temperature of the cold light lamp may be increased, or the light compensation color temperature of the warm light lamp may be increased. If only the light compensation color temperature of the cold light lamp is increased, a curve corresponding to the cold light lamp may be updated. If only the light compensation color temperature of the warm light lamp is increased, a curve corresponding to the warm light lamp may be updated. If the light compensation color temperature of both the cold light lamp and the warm light lamp is increased, the curves corresponding to both the cold light lamp and the warm light lamp may be updated.

That is, when the flash lamp includes at least two flash lamps with different color temperatures, and when each flash lamp corresponds to one curve representing a correspondence relationship between the first color temperature values and the adjusting parameters of the flash lamp, updating the curve according the difference includes follows. At least one curve is selected as a curve to be updated from the at least two curves. The selected at least one curve is updated according to the difference. The adjusting parameter of the flash lamp corresponding to the selected curve is changed.

When there is a positive correlation between the adjusting parameter and the light compensation color temperature, updating the curve according the difference includes follows. When the difference is negative, each adjusting parameters in the curve is increased by a pre-determined value. When the difference is positive, each adjusting parameter in the curve is decreased by the pre-determined value. The pre-determined value is a fixed value, or the pre-determined value is positively correlated with an absolute value of the difference.

Examples of the present disclosure aims to correct the light compensation color temperature of the flash lamp to the first color temperature value, such that the light compensation color temperature of the flash lamp is consistent with the color temperature of the environment light, thus improving image quality. Therefore, when the difference obtained by subtracting the first color temperature value from the second color temperature value is negative, it indicates that light of the second image is relatively warm. In this case, the light compensation color temperature of the flash lamp may be increased, such that the light of the second image may be colder. When the difference obtained by subtracting the first color temperature value from the second color temperature value is positive, it indicates that light of the second image is relatively cold. In this case, the light compensation color temperature of the flash lamp may be decreased, such that the light of the second image may be warmer.

There are many modes for adjusting the color temperature. For example, the color temperature may be adjusted by adjusting current, or by adjusting a duty ratio of PMW (pulse width modulation), and the like.

For example, the color temperature is adjusted by adjusting the current. The flash lamp is driven by the current, and the current value is positively correlated with the color temperature value. Therefore, if there is a need to increase the color temperature value of the flash lamp when the light compensation color temperature of the flash lamp is adjusted, the current through the flash lamp may be increased. If there is a need to decrease the color temperature value of the flash lamp, the current through the flash lamp may be decreased.

A camera and the flash lamp are separated, and the current value merely has a positive correlation with the color temperature value rather than a definite function relationship. Therefore, a value by which the current is to be adjusted cannot be calculated according to the color temperature value to be corrected. In this case, a pre-determined value for current adjusting may be set. When the current is to be increased, the current may be increased by the pre-determined value. When the current is to be decreased, the current may be decreased by the pre-determined value.

In some examples, the pre-determined value may be a fixed value. For example, the pre-determined value is 200 mA. When the current is to be increased, the current may be increased by 200 mA. When the current is to be decreased, the current may be decreased by 200 mA.

In some examples, the pre-determined value may vary over time, and the pre-determined value is positively correlated with an absolute value of the difference. For example, when a difference calculated at current time is relatively large, the pre-determined value is 500 mA. At this time, the current may be increased or decreased by 500 mA, such that the adjusting times may be reduced. When a difference calculated at next time is relatively small, the pre-determined value is 100 mA. At this time, the current may be increased or decreased by 100 mA, thus avoiding over-adjusting, and improving adjusting accuracy.

In examples of the present disclosure, the light compensation color temperature of the flash lamp is corrected during using the flash lamp of the camera. Therefore, environment for capturing the first image may be different every time. That is, the first color temperature values during respective corrections are different. Then a precise adjusting parameter may be not obtained for a certain color temperature value. In addition, a shape of the curve is fixed. Therefore, when the adjusting parameters in the curve are updated as a whole, the adjusting parameter corresponding to the certain color temperature may be increased when an adjusting parameter corresponding to another color temperature is increased, thus realizing updating the curve.

For example, the color temperature of the flash lamp is corrected according to the current change in the curve. The second color temperature value is compared with the first color temperature value at next correction. When the second color temperature value is larger than the first color temperature value, it indicates that the current value is relatively large. In this case, each of current values in the curve may be decreased by a pre-determined value. When the second color temperature value is smaller than the first color temperature value, it indicates that the current value is relatively small. In this case, each of current values in the curve may be increased by a pre-determined value. In this way, the curve may be comparatively accurate after the correction is finished.

In some examples, when a curve is set, the method provided by examples of the present disclosure may further include follows. The curve is sent to a server after the correction is finished. The server is configured to share the curve.

In some examples, the curve may be sent to the server after the correction is finished, and the server may share the curve. In this way, after other terminals that have a same flash lamp with the terminal obtain the curve, the other terminals may directly find a current change value corresponding to the first color temperature value in the curve, and then may drive the flash lamp to flash using the obtained current change value. Therefore, the light compensation color temperature may be consistent with the color temperature of environment light by only one correction, greatly improving efficiency of correcting color temperature.

In conclusion, with the method for correcting color temperature of a flash lamp provided by the present disclosure, since the first image is obtained by capturing the scene when the flash lamp is closed, and the second image is obtained by capturing the scene when the flash lamp is open, by calculating the difference of color temperature values of the same region in the first image and the second image, and by correcting the flash lamp using the difference of color temperature values, a correction error of the flash lamp may be reduced, such that the light compensation color temperature of the flash lamp is consistent with the color temperature of the environment light, improving image quality. In addition, a problem of increasing cost when the correction error is reduced by reducing the bin region is avoided, thus reducing the cost for correcting the color temperature.

The camera and the flash lamp are separated, and it may be not accurate if only one correction is performed on the color temperature of the flash lamp. Thus, the accuracy of the color temperature value of the flash lamp may be improved by periodically correcting for multiple times.

By updating the curve according to the difference obtained by subtracting the first color temperature value from the second color temperature value, and by sending the curve to the server for sharing after the correction is stopped, other terminals that have a same camera and a same flash lamp with the terminal may directly determine an adjusting parameter corresponding to the first color temperature value from the curve. By using the adjusting parameter to correct the light compensation color temperature, the light compensation color temperature can be consistent with the color temperature of the environment light only by one correction, improving efficiency of correcting color temperature.

When all the adjusting parameters in the curve are increased or decreased by the pre-determined value, the pre-determined value is positively correlated with the absolute value of the difference. Therefore, when the difference is large, a larger fixed value may be set as the pre-determined value, thus reducing correction times. When the difference is small, a smaller fixed value may be set as the pre-determined value, thus avoiding over-correction, improving correction accuracy.

Figure 3:
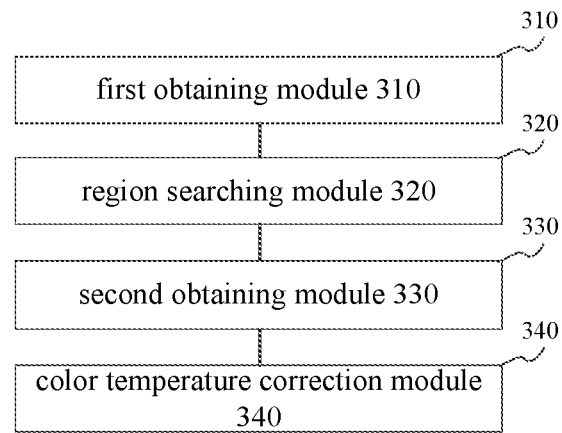
FIG. 3 is a schematic diagram illustrating a device for correcting color temperature of a flash lamp according to an example.

FIG. 3 is a schematic diagram illustrating a device for correcting color temperature of a flash lamp according to an example. The device may be realized by hardware, or may be realized by software executed by hardware. The device includes a first obtaining module 310, a region searching module 320, a second obtaining module 330, and a color temperature correction module 340.

The first obtaining module 310 is configured to obtain a first color temperature value of a gray point region in a first image.

The first image is obtained by capturing a scene when the flash lamp is closed. Each of values of respective color channels of a gray point in the gray point region is less than a preset value.

The region searching module 320 is configured to search for an image region corresponding to the gray point region in a second image. The second image is obtained by capturing the scene when the flash lamp is open, and pixel points corresponding to the gray points in the gray point region exist in the image region.

The second obtaining module 330 is configured to obtain a second color temperature value of the image region.

The color temperature correction module 340 is configured to correct light compensation color temperature of the flash lamp according to a difference obtained by subtracting the first color temperature value from the second color temperature value.

In some examples, the device may further include a color temperature determining module and a curve sending module. The color temperature determining module is configured to calculate the first color temperature value of the gray point region in the first image by image signal processing (ISP), and to calculate the second color temperature value of the image region by the ISP. The curve sending module is configured to send the curve to a server after correcting is stopped, wherein the server is configured to share the curve.

With respect to related details, reference may be made to the example illustrated in FIG. 2.

In conclusion, with the device for correcting color temperature of a flash lamp provided by the present disclosure, since the first image is obtained by capturing the scene when the flash lamp is closed, and the second image is obtained by capturing the scene when the flash lamp is open, by calculating the difference of color temperature values of the same region in the first image and the second image, and by correcting the flash lamp using the difference of color temperature values, a correction error of the flash lamp may be reduced, such that the light compensation color temperature of the flash lamp is consistent with the color temperature of the environment light, improving image quality. In addition, a problem of increasing cost when the correction error is reduced by reducing the bin region is avoided, thus reducing the cost for correcting the color temperature.

The camera and the flash lamp are separated, and it may be not accurate if only one correction is performed on the color temperature of the flash lamp. Thus, the accuracy of the color temperature value of the flash lamp may be improved by periodically correcting for multiple times.

By updating the curve according to the difference obtained by subtracting the first color temperature value from the second color temperature value, and by sending the curve to the server for sharing after the correction is stopped, other terminals that have a same camera and a same flash lamp with the terminal may directly determine an adjusting parameter corresponding to the first color temperature value from the curve. By using the adjusting parameter to correct the light compensation color temperature, the light compensation color temperature can be consistent with the color temperature of the environment light only by one correction, improving efficiency of correcting color temperature.

When all the adjusting parameters in the curve are increased or decreased by the pre-determined value, the pre-determined value is positively correlated with the absolute value of the difference. Therefore, when the difference is large, a larger fixed value may be set as the pre-determined value, thus reducing correction times. When the difference is small, a smaller fixed value may be set as the pre-determined value, thus avoiding over-correction, improving correction accuracy.

It should be noted that, the foregoing division of the functional modules is merely an example for illustrating the device provided in the foregoing examples when implementing the functions. In practical applications, the foregoing functions may be allocated to be implemented by different functional modules according to actual demands. In other words, the content structure of the device is divided into different functional modules to accomplish all or part of the functions described above.

With respect to the devices in the foregoing examples, the specific manners for the respective modules to perform operations have been described in detail in the examples related to the method, which will not be elaborated herein.

A device for correcting color temperature of a flash lamp is provided according to an example of the present disclosure, which can implement the method for correcting color temperature of a flash lamp provided in examples of the present disclosure. The device includes a processor, a memory configured to store instructions executable by the processor, and a camera having a flash lamp.

The processor is configured to: obtain a first color temperature value of a gray point region in a first image, wherein the first image is obtained by capturing a scene when the flash lamp is closed, and a difference between values of two color channels of a gray point in the gray point region is less than a preset value; search for an image region corresponding to the gray point region in a second image, wherein the second image is obtained by capturing the scene when the flash lamp is open, and there are pixel points, in the image region, corresponding to the gray points in the gray point region; obtain a second color temperature value of the image region; and correct light compensation color temperature of the flash lamp according to a difference obtained by subtracting the first color temperature value from the second color temperature value.

Figure 4:
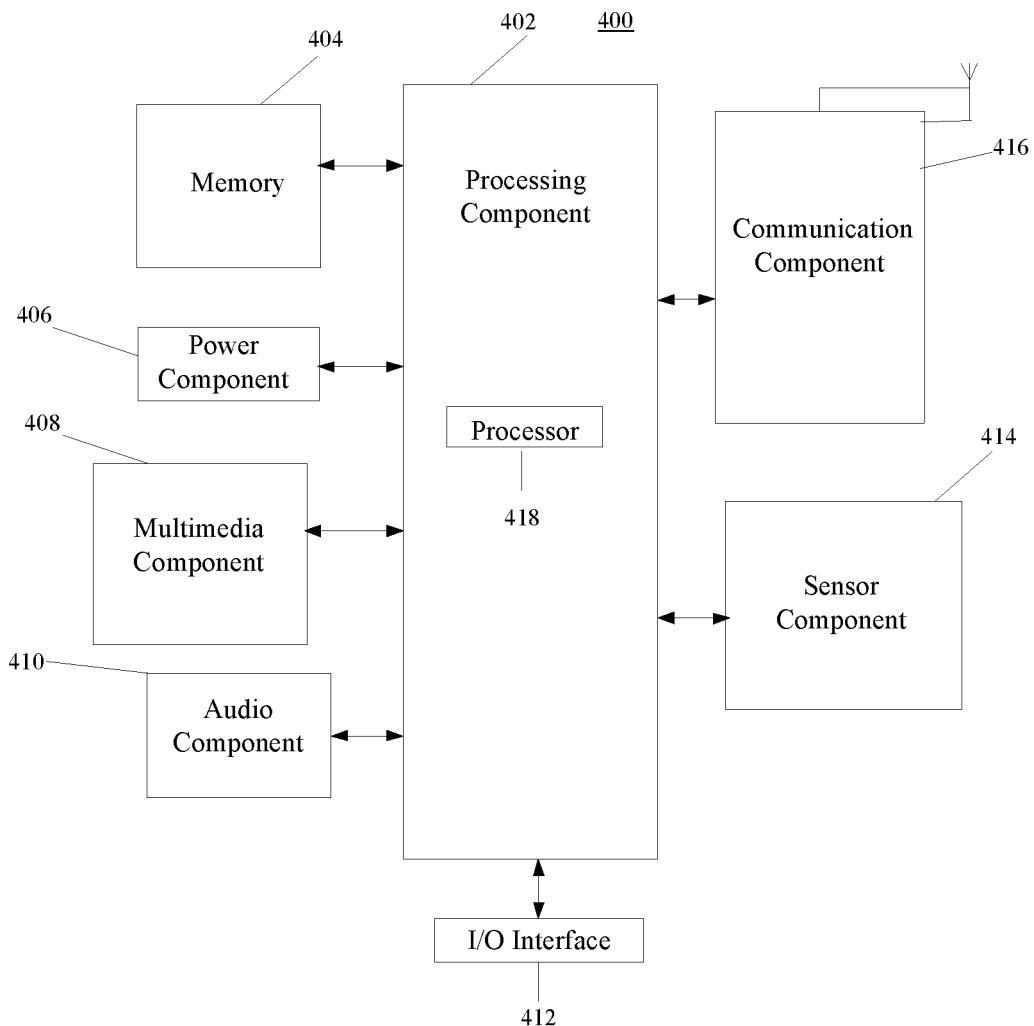
FIG. 4 is a schematic diagram illustrating a device for correcting color temperature of a flash lamp according to another example.

FIG. 4 is a schematic diagram illustrating a device 400 for correcting color temperature of a flash lamp according to another example. For example, the device 400 may be a mobile phone, a computer, a digital broadcasting terminal, a message sending and receiving device, a game console, a tablet, a medical device, exercise equipment, a personal digital assistant and the like.

Referring to FIG. 4, the device 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the device 400, such as the operations associated with display, telephone calls, data communications, camera operations, and recording operations. The processing component 402 may include one or more processors 418 to execute instructions to perform all or part of the steps in the above described methods for correcting color temperature of a flash lamp. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the device 400. Examples of such data include instructions for any applications or methods operated on the device 400, contact data, phonebook data, messages, pictures, video, etc. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the device 400. The power component 406 may include a power management system, one or more power sources, and any other components associated with the generation, management, and distribution of power in the device 400.

The multimedia component 408 includes a screen providing an output interface between the device 400 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, the multimedia component 408 includes a front camera and/or a rear camera. The front camera and the rear camera may receive an external multimedia datum while the device 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone ("MIC") configured to receive an external audio signal when the device 400 is in an operation mode, such as a call mode, a recording mode, and a voice recognition mode. The received audio signal may be further stored in the memory 404 or transmitted via the communication component 416. In some examples, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the device 400. For instance, the sensor component 414 may detect an open/closed status of the device 400, relative positioning of components, e.g., the display and the keypad, of the device 400, a change in position of the device 400 or a component of the device 400, a presence or absence of user contact with the device 400, an orientation or an acceleration/deceleration of the device 400, and a change in temperature of the device 400. The sensor component 414 may include a proximity sensor configured to detect the presence of nearby objects without any physical contact. The sensor component 414 may also include a light sensor, such as a CMOS or CCD image sensor, for use in imaging applications. In some examples, the sensor component 414 may also include an accelerometer sensor, a gyroscope sensor, a magnetic sensor, a pressure sensor, or a temperature sensor.

The communication component 416 is configured to facilitate communication, wired or wirelessly, between the device 400 and other devices. The device 400 can access a wireless network based on a communication standard, such as WiFi, 2G, or 3G, or a combination thereof. In one example, the communication component 416 receives a broadcast signal or broadcast associated information from an external broadcast management system via a broadcast channel. In one example, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the device 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In examples, there is also provided a non-transitory computer-readable storage medium including instructions, such as included in the memory 404, executable by the processor 418 in the device 400, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium has instructions stored therein that, when executed by the processor of the device 400, cause the device 400 to perform the above-mentioned method.

A computer-readable storage medium is provided according to an example of the present disclosure. The storage medium stores at least one instruction, at least one program, a code set or an instruction set thereon. The at least one instruction, the at least one program, the code set or the instruction set is loaded and executed by the processor to implement the above-mentioned method for correcting color temperature of a flash lamp.

Examples of the present disclosure provide a method and a device for correcting color temperature of a flash lamp.

According to examples of the present disclosure, there is provided a method for correcting color temperature of a flash lamp, including: obtaining a first color temperature value of a gray point region in a first image, in which the first image is obtained by capturing a scene when the flash lamp is closed, and a difference between values of two color channels of a gray point in the gray point region is less than a preset value; searching for an image region corresponding to the gray point region in a second image, in which the second image is obtained by capturing the scene when the flash lamp is open, and pixel points corresponding to the gray points in the gray point region exist in the image region; obtaining a second color temperature value of the image region; and correcting light compensation color temperature of the flash lamp according to a difference obtained by subtracting the first color temperature value from the second color temperature value.

According to examples of the present disclosure, there is provided a device for correcting color temperature of a flash lamp, including: a first obtaining module, configured to obtain a first color temperature value of a gray point region in a first image, in which the first image is obtained by capturing a scene when the flash lamp is closed, and a difference between values of two color channels of a gray point in the gray point region is less than a preset value; a region searching module, configured to search for an image region corresponding to the gray point region in a second image, in which the second image is obtained by capturing the scene when the flash lamp is open, and pixel points corresponding to the gray points in the gray point region exist in the image region; a second obtaining module, configured to obtain a second color temperature value of the image region; and a color temperature correction module, configured to correct light compensation color temperature of the flash lamp according to a difference obtained by subtracting the first color temperature value from the second color temperature value.

According to examples of the present disclosure, there is provided a device for correcting color temperature of a flash lamp, including: a processor, a memory configured to store instructions executable to the processor, and a camera having a flash lamp. The processor is configured to: obtain a first color temperature value of a gray point region in a first image, in which the first image is obtained by capturing a scene when the flash lamp is closed, and a difference between values of two color channels of a gray point in the gray point region is less than a preset value; search for an image region corresponding to the gray point region in a second image, in which the second image is obtained by capturing the scene when the flash lamp is open, and pixel points corresponding to the gray points in the gray point region exist in the image region; obtain a second color temperature value of the image region; and correct light compensation color temperature of the flash lamp according to a difference obtained by subtracting the first color temperature value from the second color temperature value.

According to examples of the present disclosure, there is provided a non-transitory computer-readable storage medium, configured to store at least one instruction, at least one program, a code set or an instruction set thereon. The at least one instruction, the at least one program, the code set or the instruction set is loaded and executed by a processor to implement a method for correcting color temperature of a flash lamp according to the first aspect of examples of the present disclosure.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only.

It is to be understood that, the present disclosure is not limited to the exact construction that has been described above and illustrated in the accompanying drawings, and that various modifications and changes can be made without departing from the scope thereof.

What is claimed is:

1. A method for correcting a color temperature of a flash lamp, comprising:
    obtaining a first color temperature value of a gray point region in a first image, wherein the first image is obtained by capturing a scene when the flash lamp is closed, and a difference between values of two color channels of a gray point in the gray point region is less than a preset value;
    searching for an image region corresponding to the gray point region in a second image, wherein the second image is obtained by capturing the scene when the flash lamp is open, and pixel points in the image region exist and the pixel points correspond to gray points in the gray point region;
    obtaining a second color temperature value of the image region; and
    correcting the color temperature for light compensation of the flash lamp according to a difference obtained by subtracting the first color temperature value from the second color temperature value.

2. The method according to claim 1, wherein correcting the color temperature for the light compensation of the flash lamp according to the difference obtained by subtracting the first color temperature value from the second color temperature value comprises:
    calculating the difference by subtracting the first color temperature value from the second color temperature value; and
    updating a curve according to the difference, wherein the curve is configured to represent a correspondence relationship between first color temperature values and adjusting parameters, and the adjusting parameters are configured to control the flash lamp to flash.

3. The method according to claim 2, wherein, when there is a positive correlation between the adjusting parameters and the color temperature for the light compensation, updating the curve according to the difference comprises:
    when the difference is negative, increasing each adjusting parameter in the curve by a pre-determined value;
    when the difference is positive, decreasing each adjusting parameter in the curve by a pre-determined value;
    wherein the pre-determined value is a fixed value, or the pre-determined value is positively correlated with an absolute value of the difference.

4. The method according to claim 2, wherein, when the flash lamp comprises at least two flash lamps with different color temperatures, and when each flash lamp corresponds to one curve representing the correspondence relationship between the first color temperature values and the adjusting parameters of the flash lamp, updating the curve according to the difference comprises:
    selecting at least one curve as a curve to be updated from at least two curves corresponding to the at least two flash lamps; and
    updating the selected at least one curve according to the difference.

5. The method according to claim 2, further comprising:
    sending the curve to a server after stopping correcting, wherein the server is configured to share the curve.

6. The method according to claim 1, further comprising:
    calculating the first color temperature value of the gray point region in the first image by image signal processing (ISP), and calculating the second color temperature value of the image region by using the ISP.

7. The method according to claim 1, wherein searching for the image region corresponding to the gray point region in the second image comprises:
    obtaining a position of the gray point region recorded in the ISP; and
    searching for the image region identified by the position in the second image.

8. A device for correcting a color temperature of a flash lamp, comprising:
    a processor;
    a memory configured to store instructions executable by the processor; and
    a camera having the flash lamp;
    wherein, the processor is configured to:
    obtain a first color temperature value of a gray point region in a first image, wherein the first image is obtained by capturing a scene when the flash lamp is closed, and a difference between values of two color channels of a gray point in the gray point region is less than a preset value;
    search for an image region corresponding to the gray point region in a second image, wherein the second image is obtained by capturing the scene when the flash lamp is open, and pixel points exist in the image region and the pixel points correspond to gray points in the gray point region;
    obtain a second color temperature value of the image region; and
    correct the color temperature for light compensation of the flash lamp according to a difference obtained by subtracting the first color temperature value from the second color temperature value.

9. The device according to claim 8, the processor is configured to:
- calculate the difference by subtracting the first color temperature value from the second color temperature value; and
- update a curve according to the difference, wherein the curve is configured to represent a correspondence relationship between first color temperature values and adjusting parameters, and an adjusting parameter is configured to control the flash lamp to flash.

10. The device according to claim 9, wherein, when there is a positive correlation between an adjusting parameter and the color temperature for the light compensation, the processor is configured to:
- when the difference is negative, increase each adjusting parameter in the curve by a pre-determined value;
- when the difference is positive, decrease each adjusting parameter in the curve by a pre-determined value;
- wherein the pre-determined value is a fixed value, or the pre-determined value is positively correlated with an absolute value of the difference.

11. The device according to claim 9, wherein, when the flash lamp comprises at least two flash lamps with different color temperatures, and when each flash lamp corresponds to one curve representing the correspondence relationship between the first color temperature values and the adjusting parameters of the flash lamp, the processor is configured to:
- select at least one curve as a curve to be updated from at least two curves; and
- update the selected at least one curve according to the difference.

12. The device according to claim 9, the processor is further configured to:
- send the curve to a server after stopping correcting, wherein the server is configured to share the curve.

13. The device according to claim 8, the processor is further configured to:
- calculate the first color temperature value of the gray point region in the first image by image signal processing (ISP), and calculate the second color temperature value of the image region by using the ISP.

14. The device according to claim 8, the processor is configured to:
- obtain a position of the gray point region recorded in the ISP; and
- search for the image region identified by the position in the second image.

15. A non-transitory computer-readable storage medium, configured to store at least one instruction thereon, wherein the at least one instruction is executed by a processor to implement:
- obtaining a first color temperature value of a gray point region in a first image, wherein the first image is obtained by capturing a scene when a flash lamp is closed, and a difference between values of two color channels of a gray point in the gray point region is less than a preset value;
- searching for an image region corresponding to the gray point region in a second image, wherein the second image is obtained by capturing the scene when the flash lamp is open, and pixel points exist in the image region and the pixel points correspond to gray points in the gray point region;
- obtaining a second color temperature value of the image region; and
- correcting a color temperature for the light compensation of the flash lamp according to a difference obtained by subtracting the first color temperature value from the second color temperature value.

16. The non-transitory computer-readable storage medium according to claim 15, wherein correcting the color temperature for the light compensation of the flash lamp according to the difference obtained by subtracting the first color temperature value from the second color temperature value comprises:
- calculating the difference by subtracting the first color temperature value from the second color temperature value; and
- updating a curve according to the difference, wherein the curve is configured to represent a correspondence relationship between first color temperature values and adjusting parameters, and an adjusting parameter is configured to control the flash lamp to flash.

17. The non-transitory computer-readable storage medium according to claim 16, wherein, when there is a positive correlation between an adjusting parameter and the color temperature for the light compensation, updating the curve according to the difference comprises:
- when the difference is negative, increasing each adjusting parameter in the curve by a pre-determined value;
- when the difference is positive, decreasing each adjusting parameter in the curve by a pre-determined value;
- wherein the pre-determined value is a fixed value, or the pre-determined value is positively correlated with an absolute value of the difference.

18. The non-transitory computer-readable storage medium according to claim 16, wherein, when the flash lamp comprises at least two flash lamps with different color temperatures, and when each flash lamp corresponds to one curve representing the correspondence relationship between the first color temperature values and the adjusting parameters of the flash lamp, updating the curve according to the difference comprises:
- selecting at least one curve as a curve to be updated from at least two curves; and
- updating the selected at least one curve according to the difference.

19. The non-transitory computer-readable storage medium according to claim 16, wherein the at least one instruction is further executed by the processor to implement:
- sending the curve to a server after stopping correcting, wherein the server is configured to share the curve.

20. The non-transitory computer-readable storage medium according to claim 15, wherein the at least one instruction is further executed by the processor to implement:
- calculating the first color temperature value of the gray point region in the first image by image signal processing (ISP), and calculating the second color temperature value of the image region by using the ISP.

* * * * *